(12) United States Patent
Marandon

(10) Patent No.: US 8,166,778 B2
(45) Date of Patent: May 1, 2012

(54) TEMPERED GLASS FOR THERMAL INSULATION

(75) Inventor: Franck Marandon, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 698 days.

(21) Appl. No.: 10/577,559

(22) PCT Filed: Oct. 5, 2004

(86) PCT No.: PCT/FR2004/050486
§ 371 (c)(1),
(2), (4) Date: Jan. 26, 2007

(87) PCT Pub. No.: WO2005/042428
PCT Pub. Date: May 12, 2005

(65) Prior Publication Data
US 2007/0157919 A1  Jul. 12, 2007

(30) Foreign Application Priority Data

Oct. 29, 2003  (FR) ..................................... 03 12648
Jan. 22, 2004  (FR) ..................................... 04 00596

(51) Int. Cl.
*C03C 15/00* (2006.01)
*B32B 17/00* (2006.01)
*F23M 7/00* (2006.01)
*F24C 15/04* (2006.01)

(52) U.S. Cl. ...... 65/30.14; 65/30.13; 428/410; 126/190; 126/200

(58) Field of Classification Search .................. 65/30.13, 65/30.14; 126/190, 200; 501/65–72; 428/49, 428/410
See application file for complete search history.

(56) References Cited

U.S. PATENT DOCUMENTS

| 3,356,477 | A |   | 12/1967 | Chisholm et al. |
|-----------|---|---|---------|-----------------|
| 4,048,978 | A | * | 9/1977  | Plumat et al. .................. 126/200 |
| 4,207,862 | A | * | 6/1980  | Meyer ........................... 126/506 |
| 4,483,700 | A | * | 11/1984 | Forker et al. .................. 65/30.14 |
| 4,671,814 | A |   | 6/1987  | Aratani et al. |
| 4,817,585 | A | * | 4/1989  | Craver .......................... 126/200 |
| 5,471,973 | A | * | 12/1995 | Wilhoite ....................... 126/200 |
| 5,773,148 | A |   | 6/1998  | Charrue et al. |
| 6,024,084 | A | * | 2/2000  | Gerhardinger ............... 126/200 |
| 6,172,817 | B1 |  | 1/2001  | Senapati et al. |
| 6,561,180 | B1 |  | 5/2003  | Austin et al. |
| 6,905,991 | B1 | * | 6/2005 | El Khiati et al. ................ 501/70 |
| 2001/0049327 | A1 | * | 12/2001 | Hachitani ....................... 501/69 |

FOREIGN PATENT DOCUMENTS

| CN | 2266083 Y | 10/1997 |
|----|-----------|---------|
| DE | 36 08 967 | 10/1986 |
| DE | 42 06 268 | 11/1992 |
| EP | 0 953 807 | 11/1999 |
| EP | 1 038 845 | 9/2000 |
| JP | 2004-131314 | 4/2004 |
| WO | WO 99/48824 | 9/1999 |
| WO | 01/38249 | 5/2001 |

* cited by examiner

*Primary Examiner* — Jerry Lorengo
*Assistant Examiner* — Noah Wiese
(74) *Attorney, Agent, or Firm* — Oblon, Spivak, McClelland, Maier & Neustadt, L.L.P.

(57) ABSTRACT

The invention relates to a pane that has undergone a chemical toughening operation so as to have an alkali-metal-ion concentration gradient from its surface over an exchange depth of at least 100 μm, a surface stress of at least 200 MPa, and a strain point at the core of at least 550° C. The pane can be used especially in the field of domestic cooking, as a pyrolytic oven door, stove, fire guard, flue insert, and more generally for separating two gaseous atmospheres at different temperatures. The pane is particularly resistant to heat shocks.

43 Claims, No Drawings

TEMPERED GLASS FOR THERMAL INSULATION

The invention relates to a glass or a pane that has undergone a chemical toughening operation, which can be used in particular in the field of domestic cooking, as an oven door (more particularly for ovens called "pyrolytic" ovens), stove, cooker, fire guard, flue insert, and more generally for separating two gaseous atmospheres at different temperatures.

The glass used in the field that has just been described must in general be able to:
- withstand high temperatures, especially up to 530° C., for as long as possible;
- withstand the fact that a hot atmosphere (especially at up to 530° C.) is on one side of the pane whereas a cold atmosphere (especially at room temperature, that is to say generally from 18 to 40° C.) is on the other side;
- withstand heat shocks, such as those described in the EN 60335-2-6 standard, and especially those created by cold water (for example at 20° C.) being sprayed on one of its main faces, even though the other face is in contact with a hot atmosphere (for example at 530° C.);
- withstand mechanical shocks; and,
- exhibit sufficient mechanical strength, taking its use into account, especially when it is desired to be able to use the pane as a door without the use of a frame for supporting it.

This combination of properties may at least be partly provided by or approached by particular glass or ceramic compositions such as certain borosilicate glasses or certain glass-ceramics. However, these particular compositions are costly.

Thermally or chemically toughened glasses provide good mechanical strength but they are reputed to rapidly relax, which means that the advantage afforded by the toughening is too quickly lost on account of the intended applications. In addition, the chemical toughening of certain glasses is difficult to carry out and not really envisioned owing to the low diffusion coefficient of the ions involved in chemical toughening.

According to the invention, a particular glass (or pane) that has undergone a sufficiently pronounced chemical toughening operation so that the depth of ion exchange (with alkali metal ions) is at least 100 μm and so that the surface stress is at least 200 MPa, is suitable within the context of the above-mentioned applications. Within the context of the invention, the starting glass, that is to say before chemical toughening, must have the following characteristics:
- a strain point (which corresponds to the temperature at which the viscosity of the glass is $10^{14.5}$ poise) of at least 550° C. and preferably at least 570° C.;
- preferably, an interdiffusion coefficient of the alkali metal ions exchanged at 400° C. of at most $9 \times 10^{-17}$ $m^2 \cdot s^{-1}$; and
- preferably, a ratio of the interdiffusion coefficient of the alkali metal ions exchanged at 490° C. to the interdiffusion coefficient of the alkali metal ions exchanged at 400° C. of at least 20.

The invention therefore relies on a glass having a low interdiffusion coefficient of the exchanged ions at 400° C. According to the invention, it is even possible to use a glass having a low interdiffusion coefficient of the exchanged ions at 490° C., especially a glass whose interdiffusion coefficient of the exchanged ions at 490° C. is less than $2 \times 10^{-15}$ $m^2 \cdot s^{-1}$. From this standpoint, the invention goes counter to what is established in the field of chemical toughening, since it makes use of a glass having a low interdiffusion coefficient of the ions, which means a low chemical toughening capability, for nevertheless chemically toughening it.

The operation of chemical toughening is known per se in its principle. A conventional chemical toughening technique may be applied to the invention, on the one hand by adapting it to the fact that an initial glass ill suited to chemical toughening is used and, on the other hand, by carrying out the operation for a long enough time for the desired ion-exchange depth and surface stress values to be obtained.

Chemical toughening modifies the surface of glass. However, the core remains unchanged, so that, after chemical toughening, the strain point in the core is that of the glass before chemical toughening.

Before the chemical toughening treatment, the initial glass must contain an alkali metal oxide. This oxide may be $Na_2O$ or $Li_2O$ and may be present in the glass in an amount of, for example, 1 to 20% by weight. The chemical toughening treatment consists in replacing alkali ions initially in the glass with other, larger alkali metal ions. If the initial oxide is $Na_2O$, a $KNO_3$ chemical toughening treatment is applied so as to replace, at least partly, $Na^+$ ions with $K^+$ ions. If the initial oxide is $Li_2O$, an $NaNO_3$ or $KNO_3$ chemical toughening treatment is applied so as to replace, at least partly, $Li^+$ ions with $Na^+$ or $K^+$ ions, depending on the case. The toughening operation results in a $K^+$ or $Na^+$ ion concentration gradient perpendicular to at least one of the principal faces and decreasing from said principal face.

The starting glass (before chemical toughening) and the final glass (after chemical toughening) are silica-based mineral glasses.

The final glass is a mixed alkali glass, that is to say it comprises at least two different alkali metal oxides (especially as the result of the chemical toughening that it has undergone). In general it contains 50 to 80% silica $SiO_2$. In general it contains 5 to 30% of alkali metal oxide for formula $M_2O$, in which M is an alkali metal such as Na, K or Li. Before the chemical toughening, the glass used contains the same amount of silica and substantially the same total amount of alkali metal oxides, the difference from the final glass being that the starting glass may contain only a single alkali metal oxide. The chemical toughening causes alkali metal ion exchange, without the total molar content of alkali metal oxides being modified.

In general, the chemical toughening is carried out immersing the glazing to be treated in a chosen molten salt bath (the salt generally $NaNO_3$ or $KNO_3$). This bath contains the concentrated salt. The chemical toughing is generally carried out between 380° C. and 520° C., and in any case at a temperature below the softening temperature of the glass to be treated. The chemical toughening causes ion exchange at the surface of the treated glass over a depth that may range, for example, up to 300 μm. This ion exchange is the origin of alkali metal ion concentration gradients. In general, such a gradient is characterized by a reduction in the concentration of ions provided by the chemical toughening (generally $K^+$ or $Na^+$) starting from the principal face and going toward the core of the glazing. This gradient exists between the surface and, for example, a depth of at most 300 μm.

The ion exchange depth $d_e$ may be determined:
a) either by $$d_e = \frac{\sqrt{\pi} \, M_g d_g \Delta m}{32 a m_i}$$

in which
a represents the molar % of initial alkali metal oxide in the glass (for example $Na_2O$ or $Li_2O$),
$m_i$ represents the initial total mass (before toughening) of the glass in grams,
$M_g$ represents the molar mass of the glass in g/mol,
Δm represents the weight increase in grams of the glass during the toughening,
$d_g$ represents the thickness in microns of the glass, $d_e$ thus being obtained in microns;

b) or by a microprobe profile, in which case it is defined by the depth at which the content of the ions provided by the toughening is equal to that of the glass matrix to within 0.5%.

Moreover, it should be noted that the chemical toughening gives the pane improved mechanical strength. This makes it particularly suitable for being used with hinges (as a door) directly incorporated into the pane, without the requirement for a supporting frame. However, it is possible nevertheless to protect the edges of the pane from mechanical shocks, for example by means of a joint (which is not necessarily load-bearing) made of metal, such as aluminum or stainless steel. Such a joint is placed around the border of the pane.

The glass or the pane according to the invention is used especially as an external wall (generally forming part of a door) of a pyrolytic oven or a stove or a flue insert. In the case of a pyrolytic oven, the pane generally forms part of a wall (which includes the doors) comprising at least two parallel panes, generally at most five parallel panes and in most cases three parallel panes, said parallel panes being separated by an air gap. The wall comprising the pane according to the invention may be at least one of them and more particularly that one in direct contact with the internal atmosphere of the oven, the temperature of the atmosphere possibly being between 460 and 530° C. The wall comprising the pane according to the invention may separate the inside of the pyrolytic oven, the atmosphere of which is generally raised to a temperature ranging from 460 to 530° C., from the outside of the oven in contact with ambient air. In the case of stoves and flue inserts, the pane is generally a single pane for insulating the atmosphere of the room from the inside of the stove or flue. In this case, the pane according to the invention itself provides the separation between a hot atmosphere raised to a temperature ranging from 300 to 530° C. and a cold atmosphere consisting of the ambient air of a room. Within the context of the present application, it will be considered that the ambient air is at the average temperature of a room, namely between 18 and 40° C., especially about 20° C.

Depending on the envisioned use, in general the pane according to the invention may especially meet at least one of the following conditions without breaking:
 a) being heated at 500° C. in air for at least 300 hours, then being heated at 300° C. for one hour and then being immediately (which means that the pane is not left to cool down) sprayed with water at 20° C.,
 b) being heated at 400° C. in air for at least 3 years, followed immediately (which means that the pane is not left to cool down) by being sprayed with water at 20° C. on one side of the pane;
 c) one of the principal faces being in contact with a first gaseous atmosphere (which is chemically neutral with respect to the pane, such as especially air) at a temperature ranging from 350° to 530° C., the other face being in contact with a second gaseous atmosphere (which is chemically neutral with respect to the pane, such as especially air) at a temperature at least 50° C., or even at least 100° C., below the temperature of the first gaseous atmosphere, these conditions being maintained for at least 2 hours, before being immediately sprayed with water at 20° C. on the side that was in contact with the hotter atmosphere. The temperature of the second gaseous atmosphere may be that of the ambient air of a room; and
 d) in a glazing assembly comprising several parallel panes (for example 2 or 3 or 4 or 5 panes), the pane according to the invention being combined with other panes parallel thereto, the various panes being separated by air gaps, and so that said glazing assembly separates a first atmosphere (which is chemically neutral with respect to the pane, such as especially air) at a temperature ranging from 350 to 530° C. from a second gaseous atmosphere (which is chemically neutral with respect to the pane, such as especially air) at a temperature at least 50° C., or even at least 100° C., below the temperature of the first gaseous atmosphere, these conditions being maintained for at least two hours, before being immediately sprayed with water at 20° C. on the side that was in contact with the hotter atmosphere. In this application, the pane according to the invention may be in contact with the hotter atmosphere. In this application, all the panes may be according to the invention. The temperature of the second gaseous atmosphere may be that of the ambient air of a room.

The pane according to the invention may have a thickness ranging from 2 to 7 mm. The invention is more particularly applicable to panes having a thickness ranging from 2.8 to 5 mm, especially about 3 mm. In general the pane is flat.

The glass or the pane according to the invention may be included in a door, especially including hinges directly integrated into said pane. The glass or the pane or the door according to the invention may be included in a cooker or fire guard or flue insert or stove or oven, especially of the pyrolitic type. More generally, the glass or the pane according to the invention may be used to separate two gaseous atmospheres at different temperatures, the first being at a temperature ranging from 300 to 530° C., the second being at a temperature at least 50° C. below the first, or even at least 100° C. below the first, or even at room temperature, and to do so with a reduced risk of breakage thanks to the good heat shock resistance.

The suitability of a pane for the use intended by the present invention may especially be determined by subjecting the pane to repeated cycles of heating at 500° C. or 400° C., followed by a heat shock at 400° C. by spraying water at 20° C. onto one side of the pane, until the pane fractures. The larger the number of cycles the pane withstands, the more suitable it is for the intended use. The pane according to the present invention may withstand at least 50 of these cycles, or even at least 100 cycles, or even at least 200 cycles.

When the duration of such determinations is particularly long, it may be estimated from a calculation based on measurements carried out at higher temperature in order to accelerate the test. For example, a withstand time at 400° C. may be estimated from tests carried out at 500° C. To do this, the inventor has found that the following formula can be used:

Estimated time for 400° C.=measured time at 500° C.×$ID_{500}/ID_{400}$, in which ID500 is the interdiffusion coefficient of the exchanged alkali metal ions at 500° C. and $ID_{400}$ is the interdiffusion coefficient of the alkali metal ions exchanged at 400° C. This approximation was used for example 2.

In the examples below, the following names and abbreviations will be used:
 $d_e$: depth of alkali metal ion exchange as a result of the chemical toughening;
 $\sigma_s$: surface stress;

SP: strain point

ID: interdiffusion coefficient of the alkali metal ions exchanged;

$ID_{490}$: interdiffusion coefficient of the alkali metal ions exchanged at 490° C.;

$ID_{400}$: interdiffusion coefficient of the alkali metal ions exchanged at 400° C.;

$T_t$: chemical toughening temperature;

$D_t$: chemical toughening time;

$N_{cycle}$: number of 500° C./20° C. water spray cycles to fracture the pane.

In the case of the examples, the following measurement techniques were used:

exchange depth: measurement, by weight increase (Equation a), before and after chemical toughening;

surface stress: measurement using a "stratorefractometer" (an apparatus described in particular in the thesis by C. Guillemet ("Doctor of Engineering Thesis", Faculty of Sciences, Paris, (1968)).

EXAMPLES

The glasses used were of the Solidion, Planilux and CS77 brand as sold by Saint-Gobain Glass France.

Table 1 gives the SP (strain point) values and the values of the interdiffusion coefficients ID of these glasses for the temperatures used in the examples.

TABLE 1

| | SP | ID | $ID_{490}/ID_{400}$ |
|---|---|---|---|
| Solidion | 500° C. | at 400° C.: $4.5 \times 10^{-15}$ m$^2 \cdot$s$^{-1}$ | 10.5 |
| | | at 460° C.: $2.3 \times 10^{-14}$ m$^2 \cdot$s$^{-1}$ | |
| | | at 490° C.: $4.5 \times 10^{-14}$ m$^2 \cdot$s$^{-1}$ | |
| | | at 500° C.: $5.8 \times 10^{-14}$ m$^2 \cdot$s$^{-1}$ | |
| Planilux | 505° C. | at 400° C.: $1.0 \times 10^{-16}$ m$^2 \cdot$s$^{-1}$ | 38.0 |
| | | at 460° C.: $1.3 \times 10^{-15}$ m$^2 \cdot$s$^{-1}$ | |
| | | at 490° C.: $3.4 \times 10^{-15}$ m$^2 \cdot$s$^{-1}$ | |
| | | at 500° C.: $4.5 \times 10^{-15}$ m$^2 \cdot$s$^{-1}$ | |
| CS77 | 585° C. | at 400° C.: $3.8 \times 10^{-17}$ m$^2 \cdot$s$^{-1}$ | 24.5 |
| | | at 460° C.: $4.3 \times 10^{-16}$ m$^2 \cdot$s$^{-1}$ | |
| | | at 490° C.: $9.35 \times 10^{-16}$ m$^2 \cdot$s$^{-1}$ | |
| | | at 500° C.: $1.4 \times 10^{-15}$ m$^2 \cdot$s$^{-1}$ | |

Preparation of the Specimens for the Examples

Panes made from each of the glasses were obtained with dimensions of 300×200×d, d being the thickness of the panes tested. The edges of these panes were shaped using a band edger with the reference P180Y, sold by 3M. The panes were immersed in a KNO$_3$ bath heated to the temperature $T_t$ for a time $D_t$. This treatment put the surface layer of the glasses into compression, thereby toughening them.

The degree of toughening of the panes may be characterized by measuring their compressive surface stress $\sigma_s$ and their exchange depth $d_e$. The higher these two parameters the greater the toughening.

All the panes were chemically toughened so as to obtain an exchange depth $d_e$ of 150 μm for each of them, which corresponds to the treatments indicated in the first three rows of Table 2. The refractometer was used to measure $\sigma_s$ optically and $d_e$ was measured by the difference in weight before and after toughening. Two trials, CS77 (A) and CS77 (B), were carried out with the CS77 in order to determine the influence of the chemical toughening time, and therefore of the exchange depth.

TABLE 2

| | t | $T_t$ | $D_t$ | $\sigma_s$ | $d_e$ |
|---|---|---|---|---|---|
| Solidion | 3 mm | 460° C. | 17 hours | 450 MPa | 178 μm |
| Planilux | 2.8 mm | 460° C. | 300 hours | 370 MPa | 180 μm |
| CS77 (A) | 2.8 mm | 490° C. | 360 hours | 350 MPa | 176 μm |
| CS77 (B) | 2.8 mm | 490° C. | 24 hours | 345 MPa | 45 μm |

After these chemical toughening treatments, the CS77 panes were the least toughened.

Example 1

Stove 500° C. then 400° C.

The chemically toughened specimens were then subjected to a repetition of the following cycles: 500° C. heating for 2 hours followed by 400° C. heating for one hour immediately followed by spraying with cold water (at 20° C.) on one side of the pane. The cycles were repeated until the panes fractured. Table 3 indicates the minimum number of cycles that the panes withstood before breaking.

TABLE 3

| | Number of cycles |
|---|---|
| Solidion | 4 |
| Planilux | 7 |
| CS77 (A) | 250 |
| CS77 (B) | 35 |

Example 2

Simulation of a 400° C. Domestic Stove

From the results of the preceding example, the behavior of the panes with which a stove operating continuously at 400° C. was simulated (using the formula given above). Table 4 indicates the minimum heating time beyond which breakages occur when the hot panes (at 400° C.) are sprayed with cold water (at 20° C).

TABLE 4

| | estimated heating time at 400° C. before breaking when subjected to heat shock |
|---|---|
| Solidion | 103 hours (i.e. 4.3 days) |
| Planilux | 630 hours (i.e. 26 days) |
| CS77 (A) | 18421 hours (i.e. 2.1 years) |

The invention claimed is:

1. A cooker or fire screen or flue insert, comprising a door having a pane of glass positioned to be in direct contact with a hot atmosphere, wherein the glass comprises at least one type of alkali metal ion, an alkali-metal-ion concentration gradient from its surface over an exchange depth of at least 100 μm, a surface stress of at least 200 MPa and a strain point in the core of at least 550° C., wherein the glass comprises an interdiffusion coefficient, at 490° C., of exchanged alkali metal ions, of less than $2 \times 10^{-15}$ m$^2 \cdot$s$^{-1}$.

2. An oven, comprising a door having a pane of glass positioned to be in direct contact with a hot atmosphere, wherein the glass comprises at least one type of alkali metal ion, an alkali-metal-ion concentration gradient from its surface over an exchange depth of at least 100 μm, a surface stress of at least 200 MPa and a strain point in the core of at least 550° C.,
wherein the glass comprises an interdiffusion coefficient, at 490° C., of exchanged alkali metal ions, of less than $2\times10^{-15}$ m$^2\cdot$s$^{-1}$.

3. The oven of claim 2, wherein the oven is a pyrolytic oven.

4. A stove, comprising a door having a pane of glass positioned to be in direct contact with a hot atmosphere, wherein the glass comprises at least one type of alkali metal ion, an alkali-metal-ion concentration gradient from its surface over an exchange depth of at least 100 μm, a surface stress of at least 200 MPa and a strain point in the core of at least 550° C.,
wherein the glass comprises an interdiffusion coefficient, at 490° C., of exchanged alkali metal ions, of less than $2\times10^{-15}$ m$^2\cdot$s$^{-1}$.

5. The cooker or fire screen or flue insert of claim 1, wherein the glass comprises an interdiffusion coefficient, at 400° C., of alkali metal ions exchanged, of at most $9\times10^{-17}$ m$^2\cdot$s$^{-1}$.

6. The cooker or fire screen or flue insert of claim 1, wherein the ratio of the interdiffusion coefficient, at 490° C., of the exchanged alkali metal ions, to the interdiffusion coefficient, at 400° C., of the exchanged alkali metal ions, is at least 20:1.

7. The cooker or fire screen or flue insert of claim 1, wherein the strain point in the core is at least 570° C.

8. The cooker or fire screen or flue insert of claim 1, wherein the at least one type of alkali metal ion is selected from the group consisting of Na$^+$, Li$^+$, K$^+$ and combinations thereof.

9. The cooker or fire screen or flue insert of claim 1, wherein the exchange depth is at most 300 μm.

10. The cooker or fire screen or flue insert of claim 1, wherein the thickness of the pane ranges from 2 to 7 mm.

11. The cooker or fire screen or flue insert of claim 1, wherein the thickness of the pane ranges from 2.8 to 5 mm.

12. The oven of claim 2, wherein the glass comprises an interdiffusion coefficient, at 400° C., of alkali metal ions exchanged, of at most $9\times10^{-17}$ m$^2\cdot$s$^-$.

13. The oven of claim 2, wherein the ratio of the interdiffusion coefficient, at 490° C., of the exchanged alkali metal ions, to the interdiffusion coefficient, at 400° C., of the exchanged alkali metal ions, is at least 20:1.

14. The oven of claim 2, wherein the strain point in the core is at least 570° C.

15. The oven of claim 2, wherein the at least one type of alkali metal ion is selected from the group consisting of Na$^+$, Li$^+$, K$^+$ and combinations thereof.

16. The oven of claim 2, wherein the exchange depth is at most 300 μm.

17. The oven of claim 2, wherein the thickness of the pane ranges from 2 to 7 mm.

18. The oven of claim 2, wherein the thickness of the pane ranges from 2.8 to 5 mm.

19. The stove of claim 4, wherein the glass comprises an interdiffusion coefficient, at 400° C., of alkali metal ions exchanged, of at most $9\times10^{-17}$ m$^2\cdot$s$^{-1}$.

20. The stove of claim 4, wherein the ratio of the interdiffusion coefficient, at 490° C., of the exchanged alkali metal ions, to the interdiffusion coefficient, at 400° C., of the exchanged alkali metal ions, is at least 20:1.

21. The stove of claim 4, wherein the strain point in the core is at least 570° C.

22. The stove of claim 4, wherein the at least one type of alkali metal ion is selected from the group consisting of Na$^+$, Li$^+$, K$^+$ and combinations thereof.

23. The stove of claim 4, wherein the exchange depth is at most 300 μm.

24. The stove of claim 4, wherein the thickness of the pane ranges from 2 to 7 mm.

25. The stove of claim 4, wherein the thickness of the pane ranges from 2.8 to 5 mm.

26. The cooker or fire screen or flue insert of claim 1, further comprising a second pane of glass and wherein the glass that comprises at least one type of alkali metal ion is positioned to be in direct contact with the hot atmosphere.

27. The oven of claim 2, further comprising a second pane of glass and wherein the glass that comprises at least one type of alkali metal ion is positioned to be in direct contact with the hot atmosphere.

28. The stove of claim 4, further comprising a second pane of glass and wherein the glass that comprises at least one type of alkali metal ion is positioned to be in direct contact with the hot atmosphere.

29. The cooker or fire screen or flue insert of claim 1, wherein the glass separates two gaseous atmospheres at different temperatures, wherein the first gaseous atmosphere is at a temperature from 300 to 530° C. and the second gaseous atmosphere is at a temperature of at least 50° C. below the first gaseous atmosphere.

30. The oven of claim 2, wherein the glass separates two gaseous atmospheres at different temperatures, wherein the first gaseous atmosphere is at a temperature from 300 to 530° C. and the second gaseous atmosphere is at a temperature of at least 50° C. below the first gaseous atmosphere.

31. The stove of claim 4, wherein the glass separates two gaseous atmospheres at different temperatures, wherein the first gaseous atmosphere is at a temperature from 300 to 530° C. and the second gaseous atmosphere is at a temperature of at least 50° C. below the first gaseous atmosphere.

32. The cooker or fire screen or flue insert of claim 1, wherein the pane of glass is positioned inside of the cooker or fire screen or flue.

33. The oven of claim 2, wherein the pane of glass is positioned inside of the oven.

34. The stove of claim 4, wherein the pane of glass is positioned inside of the stove.

35. A glass comprising at least one type of alkali metal ion, an alkali-metal-ion concentration gradient from its surface over an exchange depth of at least 100 μm, a surface stress of at least 200 MPa and a strain point in the core of at least 550° C., wherein the glass has an interdiffusion coefficient, at 490° C., of exchanged alkali metal ions, of less than $2\times10^{-15}$ m$^2\cdot$s$^-$.

36. The glass of claim 35, wherein the glass comprises an interdiffusion coefficient, at 400° C., of alkali metal ions exchanged, of at most $9\times10^{-17}$ m$^2\cdot$s$^{-1}$.

37. The glass of claim 36, wherein the ratio of the interdiffusion coefficient, at 490° C., of the exchanged alkali metal ions, to the interdiffusion coefficient, at 400° C., of the exchanged alkali metal ions, is at least 20:1.

38. The glass of claim 35, wherein the strain point in the core is at least 570° C.

39. The glass of claim 35, wherein the at least one type of alkali metal ion is selected from the group consisting oft Na$^{+0}$, Li$^+$, K$^+$ and combinations thereof.

40. The glass of claim 35, wherein the exchange depth is at most 300 μm.

41. The glass of claim 35 in the form of a pane.

42. The pane of claim 41, wherein the thickness of the pane ranges from 2 to 7 mm.

43. A door comprising the pane of claim 41.

* * * * *

UNITED STATES PATENT AND TRADEMARK OFFICE
CERTIFICATE OF CORRECTION

PATENT NO.        : 8,166,778 B2
APPLICATION NO.   : 10/577559
DATED             : May 1, 2012
INVENTOR(S)       : Franck Marandon Page 1 of 1

It is certified that error appears in the above-identified patent and that said Letters Patent is hereby corrected as shown below:

Column 8, line 57, "oft $Na^{-0}$" should read --of $Na^{+}$--.

Signed and Sealed this
Third Day of July, 2012

David J. Kappos
*Director of the United States Patent and Trademark Office*